(12) United States Patent
Musa et al.

(10) Patent No.: US 6,492,437 B1
(45) Date of Patent: Dec. 10, 2002

(54) SOLVENT-BASED PROCESS FOR MANUFACTURING LATENT CURING CATALYSTS

(75) Inventors: Osama M. Musa, Hillsborough, NJ (US); Michael J. Cipullo, Salisbury, NC (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/887,450

(22) Filed: Jun. 21, 2001

(51) Int. Cl.[7] .............................. C08K 5/06; C08L 63/02
(52) U.S. Cl. .................. 523/456; 525/523; 528/119; 528/120; 528/123; 528/125; 528/407; 528/418
(58) Field of Search ................... 523/456; 528/119, 528/120, 123, 125, 407, 418; 525/523

(56) References Cited

U.S. PATENT DOCUMENTS

| | | |
|---|---|---|
| 3,438,937 A | 4/1969 | Christie et al. |
| 3,756,984 A | 9/1973 | Cornells et al. |
| 3,860,541 A | 1/1975 | Lehmann et al. |
| 3,993,707 A | 11/1976 | Cummings |
| 4,022,946 A | 5/1977 | Cummings |
| 4,066,625 A | 1/1978 | Bolger |
| 4,101,459 A | 7/1978 | Christopher |
| 4,446,257 A | 5/1984 | Kooijmans et al. |
| 4,542,202 A | 9/1985 | Takeuchi et al. |
| 4,588,617 A | 5/1986 | Oka |
| 4,689,390 A | 8/1987 | Suzuki et al. |
| 4,732,961 A | 3/1988 | Oka |
| 4,844,959 A | 7/1989 | Read et al. |
| 4,894,403 A | 1/1990 | Thomas et al. |
| 4,959,398 A | 9/1990 | Oka et al. |
| 5,357,008 A | 10/1994 | Tsai et al. |
| 5,733,954 A | 3/1998 | McKenzie et al. |
| 5,874,490 A * | 2/1999 | Arora .......................... 523/414 |

FOREIGN PATENT DOCUMENTS

| | | |
|---|---|---|
| EP | 0 385 745 | 9/1990 |
| EP | 0 659 793 A1 | 6/1995 |

* cited by examiner

Primary Examiner—Robert Dawson
Assistant Examiner—D. Aylward
(74) Attorney, Agent, or Firm—Charles W. Almer

(57) ABSTRACT

Solvent-based processes for producing latent curing catalysts without causing an extreme exotherm. The process of the present invention includes combining an amine compound curing agent with a solvent, heating the mixture, adding an epoxy/solvent mixture via slow addition, removing the solvent and then heating the remaining composition. Following the heating, a phenolic resin is added to produce the final catalyst. The final catalyst comprises an amine compound, an epoxy, phenolic resin and a solvent. Catalysts having differing properties may be produced by varying the elements of the catalyst.

26 Claims, No Drawings

SOLVENT-BASED PROCESS FOR MANUFACTURING LATENT CURING CATALYSTS

FIELD OF THE INVENTION

The present invention relates to novel solvent-based processes for making curable epoxy resin compositions.

BACKGROUND OF THE INVENTION

Articles prepared from an epoxy resin have excellent adhesion, mechanical properties, thermal properties, chemical resistance and electrical properties. These properties have led to the widespread commercial use of the articles in such items as paints, adhesives, and electrical and electronic insulation. Epoxy resin formulations used for such applications can be either a one-component system or a two-component system.

One-component systems are highly desirable for numerous reasons. For example, one-component systems allow manufacturers and consumers to avoid the complex packaging required of two-component systems, to avoid the additional mixing step of a two-component system and to avoid the possibility of an inaccurate mixing step. Further benefits of a one-component system include a reduction in variation of properties via incomplete mixing and, frequently, a longer pot life.

Amine compounds, and in particular imidazoles, are widely used as curing agents for epoxy resins because products cured with imidazoles generally exhibit highly desirable chemical and physical properties. Like most tertiary-nitrogen-containing curing agents, imidazoles react very rapidly with epoxy resin systems, even at room temperature. The resulting catalyst is generally a thermoplastic solid which has a melting point between about 70° C. and 140° C. The catalyst may be repeatedly melted and allowed to cool and resolidify. These catalysts are not subjected to cure or cross-linking when heated. Most conveniently, the catalysts are provided as finely divided powders, such as those capable of passing through a 200-mesh screen. Further, the resulting catalyst provides a synergistic effect when combined with an additional curing agent, such as a dicyandiamid.

The use of phenolic novolac resins as a reactant with the epoxy resin and the imidazole compound is highly advantageous. The composition resulting from the addition of the phenolic resin has a shelf life of up to five times longer than without the phenolic resin. This improvement is believed to be achieved by the formation of an acid-base complex or polysalt between the novolac phenolic resin and the product of the addition reaction between the oxirane group and the imino nitrogen. The epoxy resins which are most advantageous for the reaction with imidazole those with an epoxide equivalent weight of from about 170 to about 2000 and preferably a melting point below about 140° C. Sufficient epoxy resin should be utilized in order to provide a ratio of oxirane groups to imidazole compound molecules between 1:1 and 2:1. Larger relative quantities of oxirane groups will result in a thermosetting or high melting reaction product which is excessively difficult to activate with heat. Smaller relative quantities of oxirane groups will result in a reaction product which melts at a temperature below 70° C. or which contains a high proportion of residual imidazole, thus resulting in a shorter shelf life of the catalyst.

The amount of phenolic novolac resin to be included with the epoxy resin may be as much as 1.5 equivalent per molecule of the imidazole. More preferably, the ratio of phenolic novolac resin to imidazole is in the range of about 0.7–1.5 with an optimum ratio of approximately 1:1.

U.S. Pat. No. 4,066,625 discloses a unitary catalyst comprising epoxy, an imidazole and phenolic resin. The processes for the reactions between the ingredients of the catalyst, along with the various ingredients and mechanisms of reaction, are set forth in that patent and U.S. Pat. No. 4,066,625 is incorporated herein by reference as if set forth in full. No solvents are used in these disclosed processes. The solvent-free process of that patent of combining the epoxy and the imidazole produces an extremely high exotherm within minutes. Consequently, the process for manufacturing the catalyst is quite dangerous and requires extreme caution during the period in which the imidazole is added to the epoxy. Thus, it would be desirable to provide a process for manufacturing the catalyst which utilizes a solvent and eliminates the risk of the high exotherm during the addition of the imidazole to the epoxy.

SUMMARY OF THE INVENTION

The present invention provides a process for producing a catalyst without causing an extreme exotherm. The process of the present invention includes combining an amine compound curing agent with a solvent, heating the mixture, adding an epoxy/solvent mixture via slow addition, removing the solvent and then heating the remaining composition. Following the heating, a phenolic resin is added to produce the final catalyst. The final catalyst comprises an amine compound, an epoxy, phenolic resin and a residual solvent. The process may also be reversed such that the amine compound is added to the epoxy. Alternatively, epoxy resin may be added via slow addition to an initial charge solution of solvent and imidazole. Phenolic resin may be added either to the initial charge solution or via slow-addition along with the epoxy resin.

DETAILED DESCRIPTION OF THE INVENTION

A catalyst for use with epoxy resins may be produced via a method which eliminates the exotherm upon the combination of imidazole and epoxy resin. The imidazole and epoxy components which are to be selected as the starting materials for the preparation of the catalyst are chosen for the desired properties of the resulting adduct as a catalyst. Properties which are generally important and should be considered include the catalyst's chemical structure which promotes the curing reaction by anionic polymerization, the catalyst's melting point, the catalyst's compatibility with the epoxy resin which will be cured in a molten state, its quick curability and its effect of addition (high curing reactivity with the smallest amount of addition).

The starting point for the process of manufacturing the adduct is combining either an amine compound or an epoxy with a solvent. While a wide range of ratios of amine to solvent may be employed, it is most preferable to combine the amine and the solvent in a ratio of about 1:1. Preferably, the amine compound is used as the starting material. While any amine compound may be utilized for the present invention, the selection of the particular amine compound is determined by the type of epoxy compound to be combined. While it is possible to use any type of amine compound which have at least one active amino-hydrogen in their molecule with monofunctional epoxy compounds, the amine which can be combined with polyfunctional epoxy compounds is an amine compound which has only one active amino-hydrogen, i.e., having a secondary amino group, in its molecule which contributes to the addition reaction with the epoxy group. Use of compounds having at least one tertiary amino group, i.e., having no active hydrogen, is also permitted, since the presence of the tertiary amino group is desirable for increasing the concentration of the amino groups which contribute to the curing reaction of the adduct, or in other words to increase the effect of the curing agent. If this condition for combination is met, any combinations of one, two or more kinds of amine compounds may be employed.

Exemplary amines which may be utilized include imidazoles such as 2-methylimidazole; 2,4-dimethylimidazole; 2-ethyl, 4-methylimidazole; 4,5 dimethylimidazole; 2,4,5 trimethylimidazole; 2 propyl, 4,5-dimethylimidazole; 2-cyclohexyl, 4-methylimidazole; 2-butoxy, 4-allylimidazole; 2-octyl, 4-hexylimidazole; 2-ethyl, 4-phenylimidazole; 2-butyl, 5-methylimidazole; 2,5 chloro, 4-ethylimidazole; 4-methyl-2-phenylimidazole; imidazolines such as 2-methylimidazoline; piperazines such as N-methyl piperazine; anabasines such as anabisine; pyrazoles such as 3,5-dimethyl pyrazole; purines such as tetramethyl quinidine and purine; and triazoles such as 1,2,4-triazole.

Once the amine compound is chosen, a solvent is added to that amine compound. The solvent should be one which will dissolve the amine compound or the epoxy compound starting material and can precipitate the adduct in the form of particles without dissolution. Generally, a substance can dissolve in a solvent having a similar polarity. The level of polarity of a solvent is often expressed by a solubility parameter having units $(cal/cm^3)^{1/2}$. A typical range of solubility parameters of epoxy compounds will be 8 to 11 $(cal/cm^3)^{1/2}$ and that of amine compounds will be 8 or greater. The solubility of the amine compound/epoxy compound adduct will be 11 to 16. Thus, in order to achieve the desired precipitation or dispersion addition reaction of the present invention, it is suitable to use a solvent having a solubility parameter of 8 to 11.

Exemplary solvents which may be utilized include 4-methyl-2-pentanone, methyl ethyl ketone; methyl isobutyl ketone; methyl isopropyl ketone; acetone; n-butyl acetate; isobutyl acetate; ethyl acetate; methyl acetate; tetrahydrofuran; 1,4-dioxane; 2-ethoxyethanol; ethylene glycol monomethyl ether; diethylene glycol dimethyl ether; methyphenylether; toluene; p-xylene; benzene; cyclohexane; methylene chloride; chloroform; trichloroethylene; chlorobenzene; and pyridine. These solvents may be utilized separately or in mixtures of two or more solvents. It is also possible to use solvents having a solubility parameter outside the range of 8 to 11 if two or more solvents are combined to bring the solubility parameter within the desired range. However, since the precise solubility parameter of the solvents to be used may naturally differ depending upon the chemical structures of the amine compound and the epoxy compound, it is essential to make a precise selection for each individual situation.

Following the mixing of the amine and solvent, the composition is heated. The composition is heated to approximately 40–150° C. and preferably to approximately 114–118° C. Once the composition has reached this temperature, a mixture of epoxy and solvent is added via slow addition. The solvents set forth above may be also be utilized for mixture with the epoxy. While a variety of ratios of epoxy to solvent may be utilized, it is preferred to utilize a solvent to epoxy ratio of about 1:2. Any kind of epoxy compound can be employed for producing the adduct.

Exemplary epoxy compounds include monofunctional epoxy compounds such as n-butyl glycidyl ether; styrene oxide and phenylglycide ether; bifunctional epoxy compounds such as bisphenol A diblycidyl ether, bisphenol F diblycidyl ether, bisphenol S diglycidyl ether, and diglycidyl phthalate; trifunctional epoxy compounds such as triglycidyl isocyanurate, triglycidyl p-aminophenol; tetrafunctional epoxy compounds such as tetraglycidyl m-xylene diamine and tetraglycidyl diaminodiphenylmethane; and compounds having more functional groups such as cresol novolac polyglycidyl ether and phenol novolac polyglycidyl ether. The selection of epoxy compounds is also determined by the type of the amine compound to which it is to be combined. Thus, while the amine compounds having only one active hydrogen can be combined with any kind of epoxy compounds, monofunctional epoxy compounds alone can only be combined with amine compounds having two or more active hydrogens.

Following the combination of the amine compound/solvent and epoxy/solvent mixtures, the solvents are removed from the composition. The removal of the solvent may be performed by any number of processes, including the use of a trap and/or a vacuum. It is preferable to remove essentially all of the solvent, however it is likely that the composition will contain a small amount of residual solvent. Once the solvent is removed, the composition is heated to a temperature of about 120–250° C. and most preferably about 160° C.

The desired phenolic resin may be added to the mixture to produce the final adduct at various points in the process. The phenolic novolac resins may be added before or after the removal of the solvent or they may be added with a solvent. In an alternative procedure, the phenolic novolac resins may be added to the initial charge solution. The phenolic novolac resins which are advantageously reacted with an imidazole compound and epoxy resin to form particularly advantageous curing agents are the so-called "two-step" resins or phenolic novolacs containing at least two phenolic groups per molecule and are usually obtained by the use of acidic catalysts by reacting phenol and formaldehyde in a mol ratio greater than 1 to 1. Commercially available examples of phenolic novolac resins are Durez 12686 (Oxychem), HRJ-2190 (Schenectady), SP-560 (Schenectady), HRJ-2606 (Schenectady), HRJ-1166 (Schenectady), HRJ-11040 (Schenectady), HRJ-2210 (Schenectady), CRJ-406 (Schenectady), HRJ-2163 (Schenectady), HRJ-10739 (Schenectady), HRJ-13172 (Schenectady), HRJ-11937 (Schenectady), HRJ-2355 (Schenectady), SP-25 (Schenectady), SP-1068 (Schenectady), CRJ-418 (Schenectady), SP-1090 (Schenectady), SP-1077 (Schenectady). SP-6701 (Schenectady), HRJ-11945 (Schenectady), SP-6700 (Schenectady), HRJ-11995 (Schenectady), SP-553 (Schenectady), HRJ-2053 (Schenectady), SP-560 (Schenectady). It is important to note that the properties of the resulting catalyst may be changed by changing the ingredients and the ratios of the ingredients.

The invention can be further described by the following examples:

EXAMPLE 1

A two liter four-necked round bottom flask was fitted with a thermocouple attached to a temperature controller, a reflux condenser, a 500 mL addition funnel and a mechanical stirrer. The flask was charged with 90.36 g of 2-methyl imidazole (2MZ) having the structure:

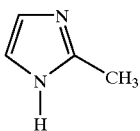

And 90.36 g of the solvent 4-methyl-2-pentanone (MIBK). As 2MZ is not soluble at room temperature, the mixture was stirred and heated to about 117° C. The stirred mixture became homogeneous at approximately 100° C. 305.45 g of EPON Resin 834 (Shell) having the structure:

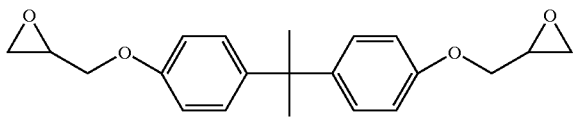

were melted at a temperature of 50° C. in a separate oven. The molten resin was mixed with 152.73 g of MIBK and placed in a funnel. While the stirring continued, the temperature remained between 117° C. and 123° C. by dropwise exothermic addition from the funnel over a period of approximately 20 minutes. It is important to note that the result is substantially identical wherein the initial charge comprises an imidazole/solvent combination and the epoxy/solvent combination is added to the initial charge and wherein the initial charge comprises an epoxy/solvent combination and the imidazole/solvent combination is added to the initial charge. During the addition, an insoluble white/pink adduct began precipitating as a viscous mass after approximately half of the addition was complete. The addition produced an epoxy/imidazole adduct having the following structure:

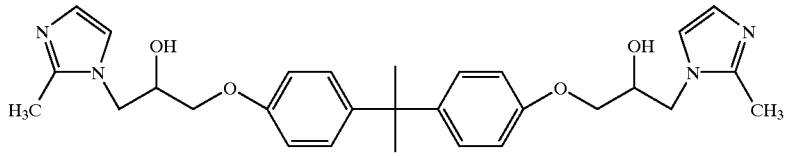

Immediately after completing the addition, a Dean-Stark trap was added to the apparatus, the temperature setpoint was increased to 160° C. and the solvent was removed at reflux. The Dean-Stark trap was drained and approximately 28 inches of vacuum was applied as the temperature of the composition approached 150° C. The residual adduct was heated under vacuum at 160° C. to remove as much of the residual solvent as possible. As the solvent was removed, the color of the composition changed from pink to red to brown. After two hours at approximately 160° C., the vacuum was removed and 206.12 g of Durez 12686 phenolic resin was added over a period of approximately 10 minutes. This time period was chosen to allow time to melt and minimize the strain on the agitator. The reaction was further continued at approximately 160° C. for about five hours. Stirring was then stopped, and the dark brown composition was poured into an aluminum pan and cooled to room temperature giving a quantitative yield of a catalyst having the following properties, which were determined after the catalyst was pulverized and screened through a 63 um sieve. The softening point of the catalyst was measured by differential scanning calorimetry (DSC) and found to be 73.47° C. The melting point of the catalyst was also measured by DSC and determined to be in the range of about 111° C. to about 116° C. Following these measurements, formulations were prepared with a 1:4 ratio of catalyst to epoxy resin (Nizet R-1 (Ciba)) and curing behavior was measured. The Tg was determined by heating the formulation to 175° C. for one hour to form a cured film and then measuring the cured film by thermal mechanical analysis. The curing behavior and Tg of the standard catalyst/epoxy resin formulation are set out in Table 1.

TABLE 1

| Properties of Standard Catalyst | | |
|---|---|---|
| Peak Temp (° C.) | Exotherm (J/g) | Tg (° C.) |
| 128.69 | −285.60 | 136.20 |

The process for producing the catalyst set forth above is one which is highly controllable, safe and produces an economy of scale. As shown in the following examples, the properties of the catalyst may be modified by variations in the process (for comparison purposes, the results of Example 1 are referred to as the results from the standard catalyst and the results of the other examples are referred to as the results of the modified catalyst).

EXAMPLE 2

A catalyst was produced and tested using the process of Example 1, however the ratio of 2MZ/epoxy resin was reduced to 1.8:1.4. The modified catalyst resulting from this process was a dark brown, brittle mass. The thermal properties of the modified catalyst are set out in Table 2.

TABLE 2

| Thermal Properties of Modified Catalyst | | |
|---|---|---|
| Catalyst | Softening Point (° C.) | Melting Point (° C.) |
| Standard | 73.47 | 111–116 |
| Modified | 86.65 | 135–138 |

Following the addition of the epoxy resin, the curing behavior and Tg were measured as shown in Table 3.

TABLE 3

| Properties of Modified Catalyst | | | |
|---|---|---|---|
| Catalyst | Peak Temp. (° C.) | Exotherm (J/g) | Tg (° C.) |
| Standard | 128.69 | −285.60 | 136.20 |
| Modified | 130.49 | −194.43 | 129.50 |

As illustrated in Tables 2 and 3, the softening and melting points of the modified catalyst were higher than those of the standard catalyst. In addition, while the peak temperature and Tg were substantially similar for the standard and modified catalysts, the exotherm of the modified catalyst was substantially lower than that of the standard catalyst.

EXAMPLE 3

A catalyst was produced and tested using the process of Example 1, however 4-methyl-2-phenylimidazole (4M2PZ) was utiliized in place of the 2MZ. 4M2PZ has a melting point which is 40° C. higher than the melting point of 2MZ. The ratio of 4M2PZ to bis-epoxy (Nizet-R-1) was 1.8:1.0. The thermal properties of the modified catalyst are set out in Table 4.

TABLE 4

Thermal Properties of Modified Catalyst

| Catalyst | Softening Point (° C.) | Melting Point (° C.) |
|---|---|---|
| Standard | 73.47 | 111–116 |
| Modified | 87.27 | 121–123 |

Following the addition of the epoxy resin, the curing behavior and Tg were measured as shown in Table 5.

TABLE 5

Properties of Modified Catalyst

| Catalyst | Peak Temp. (° C.) | Exotherm (J/g) | Tg (° C.) |
|---|---|---|---|
| Standard | 128.69 | −285.60 | 136.20 |
| Modified | 129.83 | −287.60 | 127.16 |

As illustrated in Tables 4 and 5, all of the properties of this modified catalyst are similar to the properties of the standard catalyst.

EXAMPLE 4

A catalyst was produced using the process of Example 1, however EPON 1002F (Shell) which is an epoxy with a higher softening point than EPON 834 was utilized in place of EPON 834. The thermal properties of the standard catalyst are set out in Table 6.

TABLE 6

Thermal Properties of Modified Catalyst

| Catalyst | Softening Point (° C.) | Melting Point (° C.) |
|---|---|---|
| Standard | 73.47 | 111–116 |
| Modified | 81.54 | 109–119 |

Following the addition of the epoxy resin, the curing behavior and Tg were measured as shown in Table 7.

TABLE 7

Properties of Modified Catalyst

| Catalyst | Peak Temp. (° C.) | Exotherm (J/g) | Tg (° C.) |
|---|---|---|---|
| Standard | 128.69 | −285.60 | 136.20 |
| Modified | 129.70 | −380.30 | 132.60 |

Tables 6 and 7 illustrate while many of the properties of the modified catalyst are similar to the properties of the standard catalyst, the exotherm of the modified catalyst is substantially higher than that of the standard catalyst.

EXAMPLE 5

Four different novolac resins were employed for testing. The theoretical, known thermal properties for each resin are shown in Table 8:

TABLE 8

Thermal Properties of Novolac Resins

| Novolac | Theoretical Melting Pt. (° C.) | Observed Melting Pt. (° C.) | Softening Point (° C.) |
|---|---|---|---|
| Durez 12686 | 67–75 | 70–81 | 39.40 |
| HRJ-2190 | 108–112 | 94–102 | 56.50 |
| HRJ-2606 | 189 | 163–167 | 105.60 |
| SP-560 | 151 | 149–153 | 105.60 |

Four different catalysts were manufactured utilizing the process of Example 1, but with each employing one of the different resins from Table 8. The thermal properties of the resulting catalysts are set out in Table 9.

TABLE 9

Thermal Properties of Catalysts

| Novolac | Softening Point(° C.) | Melting Point (° C.) |
|---|---|---|
| Durez 12686 | 73.47 | 111–116 |
| HRJ-2190 | 84.90 | 117–124 |
| SP-560 | 75.46 | 121–130 |
| HRJ-2606 | 102.26 | 136–144 |

Formulations were prepared with a 1:4 ratio of catalyst to resin (Nizet R-1) and curing behavior was measured. The Tg was determined by heating the formulation to form a cured film to 175° C. and then measuring the cured film by thermal mechanical analysis. The results are illustrated in Table 10.

TABLE 10

Curing Behavior and Glass Transition Temperature of Catalysts

| Novolac | Peak Temp (° C.) | Exotherm (J/g) | Tg (° C.) |
|---|---|---|---|
| Durez 12686 | 128.70 | −285.60 | 136.20 |
| HRJ-2190 | 133.70 | −184.40 | 133.80 |
| SP-560 | 122.60 | −341.30 | 127.00 |
| HRJ-2606 | 130.70 | −230.20 | 137.70 |

The results shown in Table 10 show that peak temperatures and exotherms are fairly consistent between formulations and are not a function of novolac melting point or softening point. Likewise, the Tg results do not show a relationship between novolac melting point and cured epoxy Tg.

EXAMPLE 6

Bisphenol A having the structure:

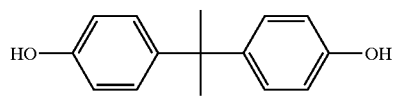

and Brominated Bisphenol A were added to the catalyst separately as a substitute for the less acidic Durez 12686 phenolic novalac in an effort to increase cure temperature by increasing the acidity of the phenolic additive. As in the standard procedure set forth in Example 1, the Bisphenol A and the Brominated Bisphenol A were blended in the Epon 834/2MZ adduct following removal of the solvent. The brittle, brown product of these reactions was pulverized and sized using a 63 um screen and the softening point and the melting point were determined. The thermal properties of the modified catalysts are compared to the those of the standard catalyst in Table 11. Evaluation of the modified catalyst containing Brominated Bisphenol A was precluded by the strong odor of the material.

TABLE 11

Thermal Properties of Modified Catalysts

| Phenolic | Softening Point (° C.) | Melting Point (° C.) |
|---|---|---|
| Durez 12686 (Standard) | 73.47 | 111–116 |
| Bisphenol A | 54.87 | 83–91 |
| Brominated Bisphenol A | N/A | N/A |

As shown in Table 11, the softening point and melting point of the catalyst were significantly reduced by the substitution of Bisphenol A for Durez 12686. A formulation for each modified catalyst was prepared using bis-epoxy (Nizet-R-1) at a weight ratio of 1:4 respectively, and the curing behavior and Tg were measured as shown in Table 12. Evaluation of the Tg of the modified catalyst containing Brominated Bisphenol A was precluded by the strong odor of the material.

TABLE 12

Properties of Modified Catalysts

| Phenolic | Peak Temp (° C.) | Exotherm (J/g) | Tg (° C.) |
|---|---|---|---|
| Durez 12686 (standard) | 126.70 | −373.00 | 123.60 |
| Bisphenol A | 124.10 | −372.80 | 118.40 |
| Brominated Bisphenol A | 128.02 | −312.20 | N/A |

As shown in Table 12, the substitution of the Bisphenol A for the Durez 12686 only slightly decreased the formulation peak temperature. The substitution of the Brominated Bisphenol A produced a catalyst with a peak temperature higher than that of the Bisphenol A catalyst and very similar to that of the standard catalyst. The exotherms for both modified catalysts were substantially similar to the exotherm of the standard catalyst. The Tg of the Bisphenol A modified catalyst was slightly lower than that of the standard catalyst.

EXAMPLE 7

An example of a standard alternative catalyst was manufactured by mixing Epon 834 and Bisphenol A neat at 90° C. 2MZ is added to the mixture to produce an epoxy/imidazole adduct which produces an extreme exotherm reaching as high as 220° C. The softening point of this standard catalyst, as determined by DSC, is in the range of about 54–69.9° C. The melting point, as determined by Fisher-Johns Melt Point Apparatus, is in the range of about 96–109° C. When the exotherm subsides, phenolic resin (Durez 12686) is blended into the reaction at 210° C. to form a different standard catalyst than that of the previous examples (the results of this catalyst are referred to in Tables 13 and 14 as those of the solvent-free process). The solvent based process may be applied to this process in four different manners to produce the benefits of reaction control, increased safety and economy of scale. The first alternative approach involves dissolving Bisphenol A and EPON 834 in MIBK. The resulting composition was then slow-added to a 2MZ/MIBK initial charge solution which had been heated to approximately 114° C. to form an epoxy/imidazole adduct (results of this alternative are referred to as Bis A in Slow-Addition process). The second alternative approach involves including Bisphenol A in the 2MZ/MIBK initial charge solution and then slow-adding an EPON 834/MIBK solution to the initial charge solution at a temperature of about 114° C. to form an epoxy/imidazole adduct (results of this alternative are referred to as Bis A in Initial Charge process). In a third alternative method, the initial charge solution comprises an epoxy/solvent/Bisphenol A combination and an imidazole/solvent combination is added to the initial charge solution via slow addition. In a fourth alternative method, the initial charge solution comprises and epoxy/solvent combination and an imidazole/solvent/Bisphenol A combination is added to the initial charge solution via slow addition. The results for all four alternatives are substantially similar and the ingredients may be added to the solution in virtually any desired order. The desired phenolic resin may be added to the mixture to produce the final adduct at various points in the process. The phenolic novolac resins may be added before or after the removal of the solvent or they may be added with a solvent. The thermal properties of the standard catalysts and catalysts made via the first two alternative methods are illustrated in Table 13. While any of the four alternative methods may be utilized, for example a sample prepared according to the second alternative method was prepared as follows. 4-Methyl-2-Pentanone (MIBK) (102.00 g), Bisphenol A (42.98 g) and 2-methyl imidazole (38.15 g) were charged in a 1 L four-necked round bottom flask fitted with a thermocouple attached to a temperature controller, a reflux condenser, a 250 mL addition funnel and a mechanical stirrer. The stirred mixture became homogeneous near 100° C. as the temperature was raised to 114° C. (temperature controller set point). A solution prepared by dissolving EPON Resin 834 (129.03 g) in 75 g of MIBK was placed in the addition funnel. Stirring was continued and the temperature was kept between 114 and 123° C. (continuous mild reflux) by dropwise exothermic addition from the addition funnel over a period of 20 minutes. An insoluble white/pink adduct began precipitating as a viscous mass after approximately half of the addition was complete. Immediately after completing the addition, a Dean-Stark trap was added to the apparatus, the temperature setpoint was increased to 160° C., and the solvent was removed at reflux. The Dean-Stark trap was drained and vacuum (~28 inches) was applied as the temperature approached 150° C. The adduct was heated under vacuum at 160° C. to remove the residual MIBK. After 2 hours at ~160° C., the vacuum was removed and the Durez 12686 phenolic resin (44.10 g) was added over an approximately 10 minute period to allow time to melt and minimize strain on the agitator. The reaction was further continued at ~160° C. for 5 hours. Stirring was then stopped, and the dark brown product was poured into an aluminum pan and cooled to room temperature giving a quantitative yield.

TABLE 13

Thermal Properties of Alternative Catalysts

| Process | Softening Point (° C.) | Melting Point (° C.) |
|---|---|---|
| Solvent-Free (Range of 6 different batches) | 54.00–69.90 | 96–109 |
| Bis A in Slow Addition | 66.00 | 102–110 |
| Bis A in Initial Charge | 70.90 | 105–114 |

As shown in Table 13, the softening and melting points for the two catalysts produced by the solvent-based were very similar to the softening and melting points of the catalyst produced by the solvent-free process. The two catalysts produced by the solvent-based process were then formulated with bis-epoxy (Nizet-R-1) at a weight ratio of 1:4, respectively. Upon the completion of this formulation, peak temperatures were measured using DSC. Following the measurement of peak temperature, the remainder of the formulation was placed in an aluminum pan and heated for two hours at 175° C. The Tg of the resulting cured epoxy film was measured using thermal mechanical analysis and the results are illustrated in Table 14.

TABLE 14

Properties of Alternative Catalyst

| Process | Peak Temp (° C.) | Exotherm (J/g) | Tg (° C.) |
|---|---|---|---|
| Solvent-Free (Range of 6 different batches) | 125.00–127.30 | −357.00–(−)435.80 | 121.30–128.40 |
| Bis A in Slow Addition | 128.16 | −387.70 | 132.10 |
| Bis A in Initial Charge | 128.04 | −336.20 | 130.50 |

As shown in Table 14, the Tg, peak temperature and exotherms for the catalyst produced by the solvent-based process are very similar to those of the catalyst produced by the solvent-free process.

We claim:

1. A method for the preparation of a curing agent for an epoxy resin system which comprises the steps of:
   (a) providing an initial charge solution of an amine compound and a solvent;
   (b) heating the initial charge solution to a temperature of about 40° C. to about 150° C.;
   (c) adding a mixture of epoxy and solvent to the initial charge solution to form an adduct;
   (d) removing essentially all of the solvent from the adduct; and
   (e) heating the adduct to a temperature of about 120° C. to about 250° C. and adding phenolic resin to the adduct.

2. A method for the preparation of a curing agent for an epoxy resin system which comprises the steps of:
   (a) providing an initial charge solution of an epoxy and a solvent;
   (b) :heating the initial charge solution to a temperature of about 40° C. to about 150° C.;
   (c) adding a mixture of amine compound and solvent to the initial charge solution to form an adduct;
   (d) removing essentially all of the solvent from the adduct; and
   (e) heating the adduct to a temperature of about 120° C. to about 250° C. and adding phenolic resin to the adduct.

3. The method of claim 1 or 2, wherein the amine compound is selected from the group consisting essentially of 2-methylimidazole; 2,4-dimethylimidazole; 2-ethyl, 4-methylimidazole; 4,5 dimethylimidazole; 2,4,5 trimethylimidazole; 2 propyl, 4,5-dimethylimidazole; 2-cyclohexyl, 4-methylimidazole; 2-butoxy, 4-allylimidazole; 2-octyl, 4-hexylimidazole; 2-ethyl, 4-phenylimidazole; 4-methyl-2-phenylimidazole; 2-butyl, 5-methylimidazole; 2,5 chloro, 4-ethylimidazole; 2-methylimidazoline; N-methyl piperazine; anabisine; 3,5-dimethyl pyrazole; tetramethyl quinidine; purine; 1,2,4-triazole; and mixtures thereof.

4. The method of claim 3, wherein the amine compound is an imidazole.

5. The method of claim 4, wherein the imidazole is 2-methyl imidazole.

6. The method of claim 1 or 2, wherein the solvent is selected from the group consisting of 4-methyl-2-pentanone; methyl ethyl ketone; methyl isobutyl ketone; methyl isopropyf ketone; acetone; n-butyl acetate; isobutyl acetate; ethyl acetate; methyl acetate; tetrahydrofuran; 1,4-dioxane; 2-ethoxyethanol; ethylene glycol monomethyl ether; diethylene glycol dimethyl ether; methyphenylether; toluene; p-xylene; benzene; cyclohexane; methylene chloride; chloroform; trichloroethylene; chlorobenzene; pyridine; and mixtures thereof.

7. The method of claim 6, wherein the solvent is 4-methyl-2-pentanone.

8. The method of claim 1 or 2, wherein the epoxy is selected from the group consisting of n-butyl glycidyl ether; styrene oxide, phenylglycide ether, bisphenol A diblycidyl ether, bisphenol F diblycidyl ether, bisphenol S diglycidyl ether, diglycidyl phthalate, triglycidyl isocyanurate, triglycidyl p-aminophenol, tetraglycidyl m-xylene diamine, tetraglycidyl diaminodiphenylmethane, cresol novolac polyglycidyl ether, phenol novolac polyglycidyl ether and mixtures thereof.

9. The method of claim 3, comprising the further step of stirring the composition throughout the process.

10. The method of claim 3, comprising the further step of heating the initial charge solution before the mixture is added to the initial charge solution.

11. The method of claim 3, wherein the initial charge solution is heated to a temperature of about 114° C. to about 118° C.

12. The method of claim 3, wherein the adduct is heated to a temperature in the range of about 150° C. to about 160° C.

13. A method for the preparation of a curing agent for an epoxy resin system which comprises the steps of:
   (a) providing an initial charge solution of an imidazole and a solvent;
   (b) heating the initial charge solution to a temperature of about 40° C. to about 150° C.;
   (c) adding a mixture of epoxy and a solvent to the initial charge solution;
   (d) removing the solvent from the adduct; and
   (e) heating the adduct to a temperature of about 120° C. to about 250° C. and adding phenolic resin to the adduct.

14. The method of claim 13, wherein the imidazole is 2-methyl imidazole.

15. A method for the preparation of a curing agent for an epoxy resin system which comprises the steps of:
   (a) providing an initial charge solution of an amine compound and a solvent;
   (b) heating the initial charge solution to a temperature of about 40° C. to about 150° C.;

(c) adding a mixture of epoxy and solvent to the initial charge solution to form an adduct;

(d) adding a mixture of phenolic resin and solvent to the adduct;

(e) removing essentially all of the solvent from the adduct; and (f) heating the adduct to a temperature of about 120° C. to about 250° C.

16. A method for the preparation of a curing agent for an epoxy resin system which comprises the steps of:

(a) providing an initial charge solution of an amine compound and a solvent;

(b) heating the initial charge solution to a temperature of about 40° C. to about 150° C.;

(c), adding a mixture of epoxy and solvent to the initial charge solution to form an adduct;

(d) adding phenolic resin to the adduct;

(e) removing essentially all of the solvent from the adduct; and (f) heating the adduct to a temperature of about 120° C. to about 250° C.

17. A method for the preparation of a curing agent for an epoxy resin system which comprises the steps of:

(a) providing an initial charge solution of an amine compound, phenolic resin and a solvent;

(b) heating the initial charge solution to a temperature of about 40° C. to about 150° C.;

(c) adding a mixture of epoxy and solvent to the initial charge solution to form an adduct;

(d) removing essentially all of the solvent from the adduct; and (e) heating the adduct to a temperature of about 120° C. to about 250° C.

18. A curing agent suitable for use with epoxy resin comprising one or more amine compounds, one or more solvents, one or more epoxies and one or more phenolic resins, wherein the composition comprises about 15 wt % amine compound, about 51 wt % epoxy resin, about 34 wt % phenolic resin and up to about 0.5 wt % (but not 0%) solvent and wherein the amine compound is selected from the group consisting essentially of 2-methylimidazole; 2,4-dimethylimidazole; 2-ethyl, 4-methylimidazole; 4,5 dimethylimidazole; 2,4,5 trimethylimidazole; 2 propyl, 4,5-dimethylimidazole; 2-cyclohexyl, 4-methylimidazole; 2-butoxy, 4-allyimidazole; 2-octyl, 4-hexylimidazole; 2-ethyl, 4-phenylimidazole; 2-butyl, 5-methylimidazole; 2,5 chloro, 4-ethylimidazole; 2-methylimidazoline; N-methyl piperazine; anabisine; 3,5-dimethyl pyrazole; tetramethyl quinidine; purine; 1,2,4-triazole; and mixtures thereof.

19. The composition of claim 18, wherein the amine compound is an imidazole.

20. The composition of claim 19, wherein the imidazole is 2-methyl imidazole.

21. The composition of claim 18, wherein the solvent is selected from the group consisting of 4-methyl-2-pentanone; methyl ethyl ketone; methyl isobutyl ketone; methyl isopropyl ketone; acetone; n-butyl acetate; isobutyl acetate; ethyl acetate; methyl acetate; tetrahydrofuran; 1,4-dioxane; 2-ethoxyethanol; ethylene glycol monomethyl ether; diethylene glycol dimethyl ether; methyphenylether; toluene; p-xylene; benzene; cyclohexane; methylene chloride; chloroform; trichloroethylene; chlorobenzene; pyridine; and mixtures thereof.

22. The composition of claim 18, wherein the epoxy is selected from the group consisting of n-butyl glycidyl ether; styrene oxide; phenylglycide ether; bisphenol A diglycidyl ether; bisphenol F diglycidyl ether; bisphenol S diglycidyl ether; diglycidyl phthalate; triglycidyl isocyanurate; triglycidyl p-aminophenol; tetraglycidyl m-xylene diamine; tetraglycidyl diaminodiphenylmethane; cresol novolac polyglycidyl ether; phenol novolac polyglycidyl ether; and mixtures thereof.

23. A method for the preparation of a curing agent for an epoxy resin system which comprises the steps of:

(a) providing an initial charge solution of an amine compound and a solvent;

(b) heating the initial charge solution to a temperature of about 40° C. to about 150° C.;

(c) adding a solution of Bisphenol A, epoxy and a solvent to the initial charge solution by slow-addition to form an adduct;

(d) removing essentially all of the solvent from the adduct;

(e) heating the adduct to a temperature of about 120° C. to about 250° C.; and (f) adding phenolic novalac resin to the adduct.

24. A method for the preparation of a curing agent for an epoxy resin system which comprises the steps of:

(a) providing an initial charge solution of an amine compound, Bisphenol A and a solvent;

(b) heating the initial charge solution to a temperature of about 40° C. to about 150° C.;

(c) adding a solution of epoxy and a solvent to the initial charge solution by slow-addition to form an adduct;

(d) removing essentially all of the solvent from the adduct;

(e) heating the adduct to a temperature of about 120° C. to about 250° C.; and (f) adding phenolic novalac resin to the adduct.

25. A method for the preparation of a curing agent for an epoxy resin system which comprises the steps of:

(a) providing an initial charge solution of an epoxy, Bisphenol A and a solvent;

(b) heating the initial charge solution to a temperature of about 40° C. to about 150° C.;

(c) adding a solution of an amine compound and a solvent to the initial charge solution by slow-addition to form an adduct;

(d) removing essentially all of the solvent from the adduct;

(e) heating the adduct to a temperature of about 120° C. to about 250° C.; and (f) adding phenolic novalac resin to the adduct.

26. A method for the preparation of a curing agent for an epoxy resin system which comprises the steps of:

(a) providing an initial charge solution of an epoxy and a solvent;

(b) heating the initial charge solution to a temperature of about 40° C. to about 150° C.;

(c) adding a solution of an amine compound, Bisphenol A, and a solvent to the initial charge solution by slow-addition to form an adduct;

(d) removing essentially all of the solvent from the adduct;

(e) heating the adduct to a temperature of about 120° C. to about 250° C.; and (f) adding phenolic novalac resin to the adduct.

* * * * *